(Model.)
H. A. STONE.
SCREW.
No. 298,427. Patented May 13, 1884.
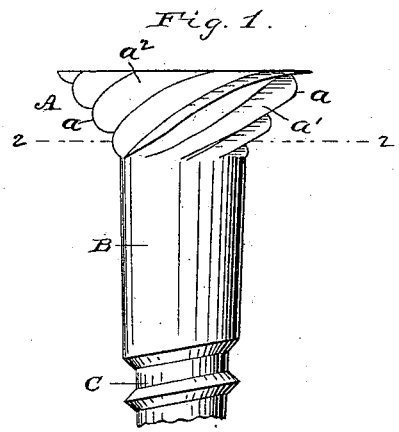
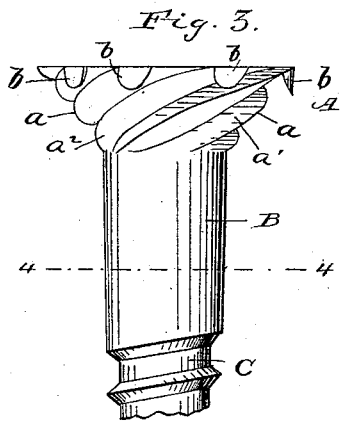
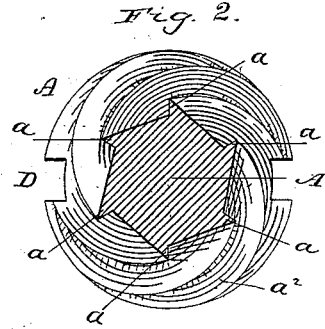
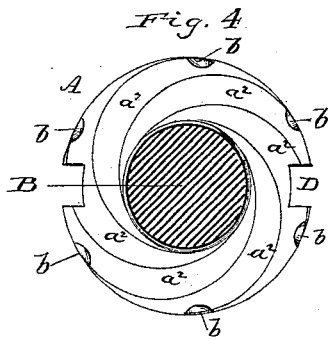
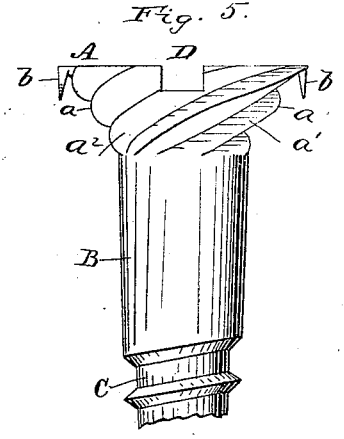
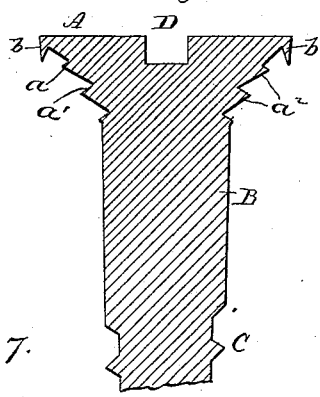
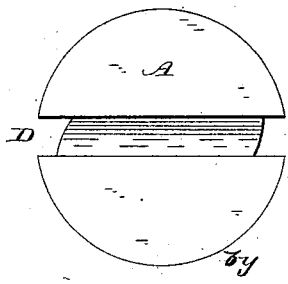
Witnesses:
Inventor:

UNITED STATES PATENT OFFICE.

HENRY A. STONE, OF BROOKLYN, NEW YORK.

SCREW.

SPECIFICATION forming part of Letters Patent No. 298,427, dated May 13, 1884.

Application filed June 11, 1883. (Model.)

*To all whom it may concern:*

Be it known that I, HENRY A. STONE, a citizen of the United States, residing at Brooklyn, in the county of Kings and State of New York, have invented certain new and useful Improvements in Screws, of which the following is a specification, reference being had therein to the accompanying drawings.

The object of my invention is to produce a screw or analogous device which will be self-countersinking, and which will also be less liable to work loose when subjected to jarring and jolting than such devices as heretofore constructed. This object is accomplished by providing the beveled portion of the head of the screw with spiral cutters, which are preferably arranged at a pitch different from that of the thread on the shank or body of the screw. As adjuncts to these spiral cutters, I provide flange-cutters for removing any roughness or splinters from the periphery of the countersink when the screws are driven into tough fibrous material.

In the accompanying drawings, in which like letters refer to similar parts in all of the figures, Figure 1 is a side view of a portion of a screw embodying one part of my invention. Fig. 2 is a section of the same on the line 2 2, Fig. 1. Fig. 3 is a side view of a portion of a screw having an equal number of spiral and flange cutters. Fig. 4 is a section on the line 4 4, Fig. 3. Fig. 5 is a side view of a portion of a screw having two flange-cutters arranged on opposite sides of the head. Fig. 6 is a section of the same, and Fig. 7 is a plan view of the head of one of my screws.

A indicates the head of the screw; B, the plain shank or body; C, the threaded portion thereof, and D the usual driving-slot. The beveled or conical portion of the head A is provided with a series of spiral undercut ridges, forming spiral cutters $a$. These cutters, excepting that they are spiral rather than oblique, are formed substantially the same as are the cutters of an ordinary countersinking-bit—that is to say, they each consist of a narrow slightly-undercut face, $a'$, and a wider face, $a^2$, said faces being arranged at an acute angle to each other. By virtue of this construction, and of the spiral arrangement of the cutters, the edges of the latter will project slightly forward in the direction in which the screw is to be turned when driven into the wood, the narrow and slightly-undercut faces $a'$ facing in said direction, thereby enabling said edges to take hold of the wood and to disintegrate or remove the same, thus forming a countersink for the head of the screw. The spiral cutters are arranged at a pitch different from that of the thread of the screw, this pitch being preferably greater than that of the thread. This arrangement of the cutters is necessary in order to cause them to disintegrate the material into which the screw-head is to be countersunk. It is obvious that if the pitch of these spiral cutters coincided with the pitch of the screw-thread said cutters would merely bury themselves in the material in the same manner that the screw-thread does, without positively disintegrating or removing any portion of such material from the countersink. The pitch of the spiral cutters may, if desired, be less than the pitch of the screw-thread, in which case, while they will in some degree disintegrate the material, they will not assist in drawing the screw into such material so long as the movement of the screw equals the pitch of the thread. I prefer, therefore, in order that these cutters, while forming the countersink for the head of the screw, may positively assist in drawing the screw into the material into which it is being driven, to form said spiral cutters at a pitch somewhat greater than the pitch of the screw-thread, as shown in the drawings.

As it would be objectionable to mar the circular contour of the face or upper surface of the head of the screw by extending the cutters outward through the periphery thereof, said cutters are formed to gradually decrease in depth toward the upper side or periphery of the head, terminating at said periphery. With this construction the cuttings or chips will be cleared from the countersink by being pushed outward therefrom until the face of the head is nearly even with the surface of the material into which the screw is being driven, when the egress for the cuttings will be through the driving-slot D. In driving my improved screw into tough fibrous material, the edge of the countersink is liable to be slightly roughened by the action of the spiral cutters. To remove this roughness I supplement the spiral cutters by small flange-cutters b, properly arranged at the outer terminations of the spiral cutters, and projecting from the periphery of the head in line, or nearly in line, with the longitudinal axis of the screw. One only of these flange-cutters might be employed; but I consider it better to use two, arranged on opposite sides of the head, as shown in Figs. 5 and 6. If desired, however, the number of the flange-cutters may equal that of the spiral cutters, as shown in Figs. 3 and 4. In this case the flange-cutters may be made quite small, and still serve the purpose for which they are intended, and for this reason this form of my invention may sometimes be considered preferable, owing to the convenience in manufacturing the same.

It is obvious that the flange-cutters will co-operate with the spiral cutters by removing any roughness occasioned by the latter, and when sunk into the material will assist in preventing the screw from working loose, the spiral cutters also serving this same purpose to a greater or less degree.

The number of the spiral cutters may be varied at pleasure, according to the size of the screw and the class of work for which it is intended. While one or two only of these spiral cutters will serve a very good purpose for the object indicated, from three to eight will generally be found preferable. In the accompanying drawings six are shown.

While my improvements are primarily intended to be applied to ordinary wood-screws, I wish it distinctly understood that I do not limit myself to their application to screws alone, as they may likewise be used in connection with carriage and other bolts having conical heads without departing from my invention.

I am aware that it is not new to provide the conical portions of screw-heads with cutters or grooves to assist in countersinking, and I do not therefore wish to be understood as claiming such constructions, broadly; but What I do claim, and desire to secure by Letters Patent, is—

1. A screw having the conical portion of its head provided with spiral cutters having a pitch greater than that of the thread of the screw, said spiral cutters gradually decreasing in depth toward and terminating at the periphery of the head, substantially as described.

2. A screw having a conical head, which is provided with spiral cutters a and flange-cutters b, substantially as described.

In testimony whereof I affix my signature in presence of two witnesses.

HENRY A. STONE.

Witnesses:
W. I. JAQUES,
H. B. ABBOTT.